Dec. 19, 1950     C. M. WELCH     2,534,644
LIQUID MEASURING GAUGE
Filed Aug. 17, 1949
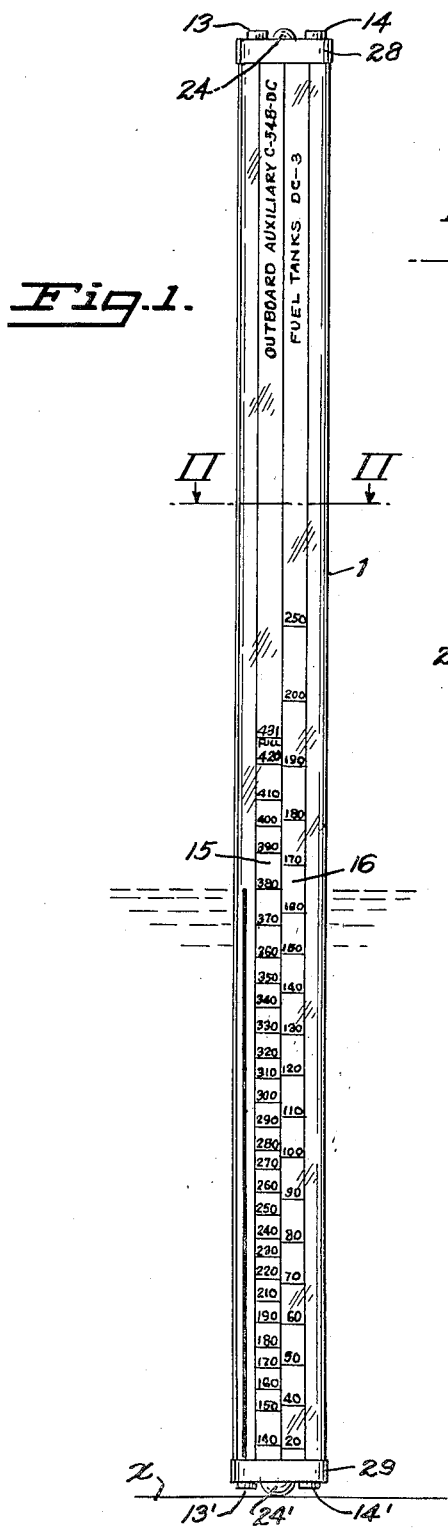
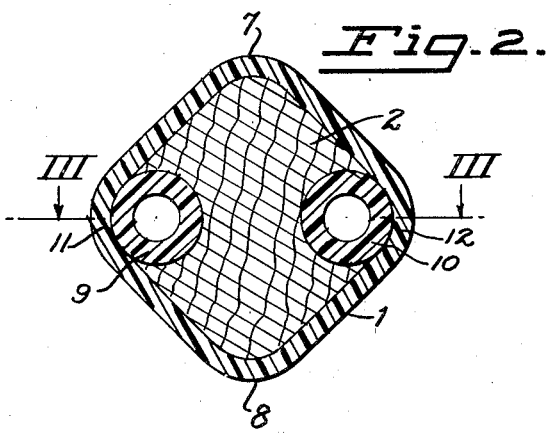
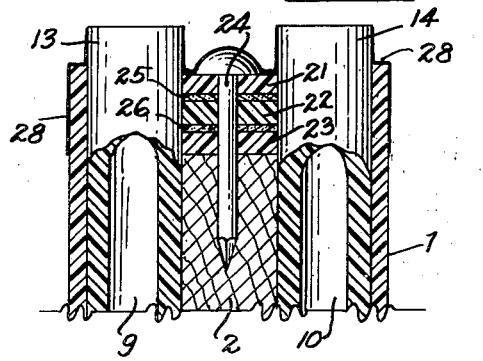
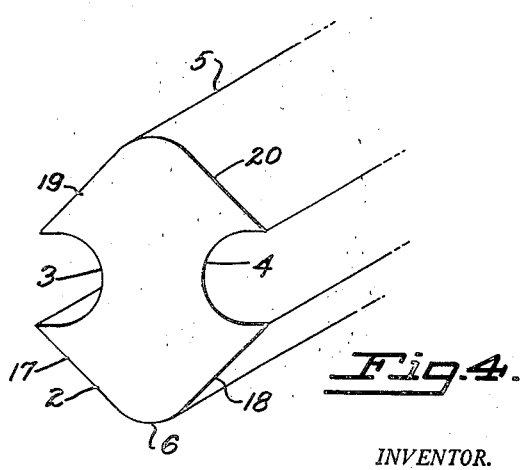
INVENTOR.
CYRIL M. WELCH
BY Baldwin Tale
ATTORNEY.

Patented Dec. 19, 1950

2,534,644

UNITED STATES PATENT OFFICE 2,534,644

LIQUID MEASURING GAUGE

Cyril M. Welch, Milbrae, Calif.

Application August 17, 1949, Serial No. 110,711

3 Claims. (Cl. 33—126.4)

This invention is particularly designed and constructed to meet the exacting requirements of fuel tank gauging in airplane service, and broadly stated resides in the particular structure and mode of fabricating the gauge assembly.

Among the objects of the invention is the provision of a fuel gauge comprising a hydrostatic measuring tube open at both ends and combined with a reinforced transparent tubular body having graduated graphic scales associated with the meausring tubes and visible through the body, with the opposite ends of the body hermetically sealed around the protruding ends of the measuring tubes.

Another object is to so combine the various elements of the structure that it will withstand the severe shocks and stresses to which it is subjected in the field practice of measuring the fuel in airplane fuel tanks, such as being accidentally dropped from considerable heights, run over by landing gear and truck wheels and abusive handling by careless operators.

A further object is to maintain the accurate adjustment of the graduated scales relative to the measuring tubes and to protect it against abrasion, soilure and surface injury.

Other objects and advantages will appear as the description proceeds. In the specification and the accompanying drawings the invention is disclosed in a specialized form. But it is to be understood that it may be embodied in other forms within the spirit of the invention as defined in the claims following the description.

In the one sheet of drawings:

Fig. 1 is a front elevation of a dual measuring gauge constructed in accordance with this invention.

Fig. 2 is an enlarged detail of the same in cross section on the line II—II Fig. 1.

Fig. 3 is a similar detail in vertical section on the line III—III Fig. 2.

Fig. 4 is an enlarged detail in isometrical perspective of the end portion of the reinforcing bar.

In detail the structure shown in Fig. 3 comprises the square tubular body 1, preferably of transparent plastic such as butyrate.

The square reinforcing bar 2, preferably of Port Orford cedar or other suitable material combining strength with lightness and freedom from warpage. This bar has the opposed longitudinal grooves 3, 4 extending its full length. The remaining corners 5, 6 are rounded to snugly fit within the rounded corners 7, 8 of the tubular body 1.

The pair of measuring tubes 9, 10 fit snugly within the grooves 3, 4 and the rounded corners 11, 12 of the body 1 with their upper and lower ends 13, 14 and 13', 14' protruding beyond the length of the body tube 1. These tubes 9, 10 are forced into position and tend to wedge the assembly tightly within the body 1.

These measuring tubes 9, 10 function independently of each other relative to their respective calibrated scales 15, 16 which are cemented to the adjacent planes 17, 18 of the reinforcing bar 2 respectively. Similar graduated scales are cemented to the opposed planes 19, 20 to read with their respective tubes 9, 10 on the opposite side of the body 1. This enables the use of four scales with the two tubes.

After the measuring tubes and reinforcing bar are assembled within the tubular body 1, as in Fig. 2, the ends of the body extending beyond the length of the bar 2 are filled and hermetically sealed by laminated plugs such as shown in Fig. 3. These plugs are composed of the superimposed laminations 21, 22, 23 die cut from sheet plastic to the outline of the end of the bar 2, with a central hole for the round headed nails. The heavy plastic cement layers 25, 26 are interposed between the laminations in sufficient quantity to exude beyond the marginal edges of the laminations. The laminated plugs are then inserted into the opposite ends of the body 1, and the nails 24, 24' are driven into the opposite ends of the reinforcing bar 2. This compresses the laminated plugs so that the cement layers 25, 26 are forced outwardly against the inner surfaces of the body ends and around the tubes 9, 10 and into the intervening interstices. This hermetically seals the tube ends against entrance of the tank fuel when the gauge is immersed therein.

As a further precaution in sealing the ends of the gauge they are immersed in a plastic solution 28, 29 up to about the height of the end plugs. This solution which is preferably of a distinctive color coats the body ends with a lacquer coating which will completely seal the texture and interstices of the plugs and the body ends 28, 29 to which they adhere, and conceal the unsightliness of the laminated plugs.

The invention operates substantially as follows: The operator grasps the upper portion of the gauge and lowers the lower end 29 into the fuel tank until it touches the bottom X. With the gauge approximately vertical the fuel enters the lower ends 13' and 14' of the measuring tubes 9 and 10 up to the top level of the fuel within the tank. The operator then presses his bare thumb or finger over the top of the selected tube such as 13. This forms an airlock between the top of the fuel in the tube 9 and the finger of the operator who then lifts the gauge from the tank. As the end 13' of the measuring tube leaves the fuel the atmospheric pressure beneath the fuel column and the airlock above it in the tube 13 holds the measured fuel column static within the tube. While holding the gauge vertical the operator observes the scale graduation such as 15 indicating that there are 380 gallons of fuel in the tank. The gauge end 29 is then held over the tank inlet and the finger pressure removed from the end 13, this releases the column of fuel within the tube 9 and it gravitates back into the tank without spilling any inflammable fuel. Thus lifting a column of liquid within a tube is old laboratory practice and no novelty is claimed therefor, except in the present combinative functioning.

The four graduated scales on the four planes 17–20 of the reinforcing bar 2 are each designated for a different fuel tank to be selectively measured as above described.

The particular merit of the present structure of the gauge is the maximum of strength with a minimum of weight, the clear visibility of the graduated scales protected behind the transparent walls of the tube 1, the laminated structure and manner of cementing the end plugs into the tube 1 preventing separation of the various parts of the assembly and the nail head 25 frees the lower ends 13' and 14' of the tubes from clogging by sedimentary deposits upon the bottom X of the tank, the presence of which is indicated in the lower content of the tube.

The body 1, tubes 9, 10, and the laminated plugs are preferably composed of butyrate plastic material which may be bonded and cemented together by amyl acetate as a solvent assuring proper chemical reactions to that end. However there are equivalent substitutions that may be available in the plastic art without departing from the present objects of this invention.

The octane values of the various gasoline fuels are distinguished by color tints introduced into the fuels by the producer. These colors such as green for 90 octane and red for 130 octane, clearly define the height of the column in the selected transparent measuring tube.

Having fully described this invention and its mode of operation what I claim and desire to secure by Letters Patent is:

1. A liquid measuring gauge comprising a tubular body of transparent material; a reinforcing bar within said body and having grooves therein and graduated scales thereon on opposite sides of said grooves; transparent measuring tubes within said grooves with their opposite ends extending beyond the length of said body; and plugs in the opposite ends of and hermetically sealing the ends of said body against the entrance of liquid within said body surrounding said measuring tubes.

2. A liquid measuring gauge comprising a tubular body of transparent material; a reinforcing bar within said body and having grooves therein; transparent measuring tubes within said grooves with their opposite ends extending beyond the length of said body; and laminated plugs hermetically sealing the opposite ends of said body and consisting of superimposed layers of sheet material fitting the contours of said ends with adhesive cement interposed between said layers which will exude and adhere to said body when said plugs are compressed against the ends of said reinforcing bar.

3. A liquid measuring gauge comprising a square tubular body of transparent material; a reinforcing bar snugly fitting within said body with its opposite ends spaced back from the opposite ends of said body respectively and having longitudinal grooves in two of its opposed corners; transparent measuring tubes within said grooves respectively with their opposite ends extending beyond the length of said body; laminated plugs hermetically sealing the opposite ends of said body and consisting of superimposed layers of sheet material fitting the contours of said ends with adhesive cement interposed between said layers which will exude and adhere to said body when said plugs are compressed against the ends of said reinforcing bar; and nails extending through the said plugs in the opposite ends of said body and penetrating the ends of said reinforcing bar and having heads bearing against said plugs for compressing said plugs when said nails are driven into the opposite ends of said bar respectively.

CYRIL M. WELCH.

No references cited.